United States Patent [19]

Martin et al.

[11] Patent Number: 4,805,177
[45] Date of Patent: Feb. 14, 1989

[54] LASER CONSTRUCTION

[75] Inventors: Danny W. Martin, St. Charles; Rodney J. Osterhage, St. Peters; Kenneth M. Summa, St. Charles, all of Mo.

[73] Assignee: Laser Diode Products, Inc., Earth City, Mo.

[21] Appl. No.: 185,706

[22] Filed: Apr. 25, 1988

[51] Int. Cl.$^4$ .......................... H01S 3/04; H01S 3/045
[52] U.S. Cl. .......................................... 372/34; 372/36
[58] Field of Search .................... 372/34, 36, 70, 75

[56] References Cited

U.S. PATENT DOCUMENTS

| 4,027,273 | 5/1977 | Yang | 372/36 |
| 4,156,206 | 5/1979 | Comerford et al. | 372/36 |
| 4,567,598 | 1/1986 | Noguchi et al. | 372/36 |

FOREIGN PATENT DOCUMENTS 2737345  3/1978  Fed. Rep. of Germany ........ 372/36

Primary Examiner—William L. Sikes
Assistant Examiner—Robert E. Wise
Attorney, Agent, or Firm—Haverstock, Garrett & Roberts

[57] ABSTRACT

A laser device having apparatus for increasing the pump energy from a laser diode array pump source that is available to be absorbed by the laser medium, the device also includes a heat sink apparatus having portions associated with the laser medium and with the pump source for dissipating the heat generated therein efficiently enough so that the device can be operated effectively even in a continuous wave mode.

18 Claims, 2 Drawing Sheets

LASER CONSTRUCTION

BACKGROUND OF THE INVENTION

The present invention relates to an improved diode laser pumped crystal construction, and, more particularly, to a laser construction having a side pumped laser medium or crystal which has one or more flat surfaces formed thereon and positioned so that when the medium is mounted the flat surfaces are respectively positioned adjacent to reflective surfaces on the mounting means in position to reflect pump energy, including divergent pump energy which otherwise would be lost, back through the crystal so as to increase the amount of pump energy absorbed therein. Some of the reflected energy may be reflected back and forth through the medium more than once. The present construction also includes improved heat dissipation means and improved temperature control means for more effectively and efficiently controlling the operating temperatures of the medium and the pump means. The present construction also facilitates independent temperature control and tuning of the separate laser portions. The separate parts of the present laser can also be manufactured separately which is an important advantage.

With known side pumped laser crystal constructions including known diode pumped laser devices, that energy which is not directed to a predetermined location within the crystal for absorption by the crystal is usually lost, and it is inevitable, especially when utilizing laser diodes as the pump source, that some energy will not be reflected back through the crystal but will be directed at some divergent angles and will pass out through the crystal and be lost. This creates inefficiency and in known lasers this kind of loss has been tolerated. In order to reduce this inefficiency and improve the energy absorption in known devices, more input energy is required and this has increased operating temperatures and caused problems and limitations. This has also led to further increases in the amount of divergent energy and hence has further increased the energy loss and further reduced efficiency. Also, by increasing the input energy, the operating temperature within the crystal increases accordingly which has a further undesirable limiting effect on the operation of the entire device.

One of the closest known prior art constructions is that disclosed in Martin U.S. patent application Ser. No. 100,557, filed Sept. 24, 1987 assigned to Applicants' assignee. This pending application discloses a diode pumped laser device with a laser medium or crystal mounted in a groove formed in a mounting member between spaced and opposed arrays of pumping diodes. Although the device disclosed in the pending application provides novel features and advantages over the known prior art, it does not contain the novel feature of the present device nor does it have the resulting advantages of the present device including reducing the number of arrays of pumping diodes and increasing the energy absorbing efficiency of the system.

The present device, in contrast to known side pumped laser diode constructions, includes distinct and independently controlled sections, including a pump source section and a laser medium or crystal section each of which can be constructed and tuned separately before being assembled. No known diode pumped laser device has the laser medium or crystal and the pump source mounted on different members that may be independently controlled and tuned and which may be separated or disassembled for adjustment, maintenance and tuning. Thus, with the present device, not only are temperature and heat dissipation independently and more effectively controlled, but the laser crystal and pump source may be seperately temperature tuned to respective power supplies. They can also be relatively more easily fabricated, assembled, and disassembled for repair and adjustment.

The independent and more precise temperature tuning and control of the present device provides many advantages. For example, an independently cooled pump source allows for use of a greater variety of pump configurations for the same or different crystals and it permits use with higher power density designs. Also, if the laser gain medium is a Neodymium YAG rod, which rods are known to have relatively poor thermal conductivity, the temperature control of the laser medium using the present device can be operated independently and the laser medium control can be set to provide more active cooling and this will not adversely effect operation of the pump source.

Further, besides providing more efficient temperature control, the laser medium or crystal included in the present device has a novel shape which enables it to be mounted and used to overcome much of the energy loss including loss of the divergent energy which is energy that moves transversely through the medium but at some angle relative to the center or axis of the medium. No known laser device has provision whereby this divergent energy is reflected back and forth through the laser medium to increase the amount of pump energy that is absorbed by the laser medium. This is achieved in the present construction largely by reshaping the crystal medium itself as by forming flat surfaces, generally at right angles to each other on the medium for positioning adjacent to polished surfaces on the mounting mmember therefor. The center of the rod before reshaping to form the flat surfaces as by grinding the medium is also used as the center for energy concentration and absorption after reshaping. The flat surfaces on the modified rod shaped medium enables the medium to be mounted on a shelf portion of the mounting member so that the surfaces of the shelf member which may be formed of material such as polished copper will aid in reflecting the pump energy which impinges thereon back through the medium.

With the present crystal construction, any pump energy that is not absorbed by the laser medium on its first pass through will be reflected by a wall member, and to some extent by the outer flat surface of the medium and this reflected energy will pass back through the medium where some will be absorbed and some will impinge on the opposite cylindrical shaped surface of the medium and some of it will be again reflected back through the medium for increased absorption. That energy which impinges on the cylindrical outer surface of the medium will to some extent be focused by the curved shape of the outer surface toward the center of the medium. Although it is recognized that not all divergent pump energy will be reflected back and forth through the medium, at least some will be and to the extent that this is so it will increase the operating efficiency. It is also preferred that the pump source be a single layer of diodes as this provides for good continuous wave (CW) operation with the cooling provided by the construction.

The fact that with the present construction the lasing medium and the pump source or diode array are mounted on separate mounting members has the further advantage of making it possible to separately manufacture, test and tune the different components, and it also facilitates disassembly of the laser parts for maintenance and other purposes.

It is a principal object of the present invention to provide a diode pumped laser device having a laser medium constructed and mounted so as to reflect some of the diverging pump energy impinging on the medium across the medium in such a way that a greater portion of the total pump energy will be absorbed by the medium.

Another object is to teach the construction of a diode pumped laser having components which are relatively easy to manufacture, test, tune, assemble and disassemble for repair and maintenance.

Another objet is to teach the construction of a diode pumped laser that uses its pump energy more efficiently than known diode pumped lasers.

Another object is to teach the construction and operation of a side pumped laser that requires fewer pump sources.

Another object is to improve the heat dissipation characteristics of diode pumped lasers.

Another object is to teach the construction and operation of a diode pumped laser that has adaquate heat dissipation to enable CW operation.

Another object is to provide improved means for thermal bonding a laser medium to a heat sink.

Another object is to provdde improved means for increasing the energy absorption characteristics of a laser medium by reflecting and focusing the pump energy including diverging pump energy passing through the medium back and forth therethrough.

Another object is to construct a laser that is relatively free of distortion due to flexing or bending of the member supporting the laser components when such member is subjected to substantial heat changes.

Another object is to minimize the possibility for misalignment of the mirrors used in a diode pumped laser device by providing more rigid support means for the laser elements.

Another object is to provide improved means for mounting the mirrors on a laser device.

These and other objects and advantages of the present invention will become apparent after considering the following detailed description of preferred embodiments in conjunction with the accompanying drawings.

DETAILED DESCRIPTION OF DRAWINGS

DETAILED DESCRIPTION OF THE PREFERRED EMBODIMENT

Figure 1:
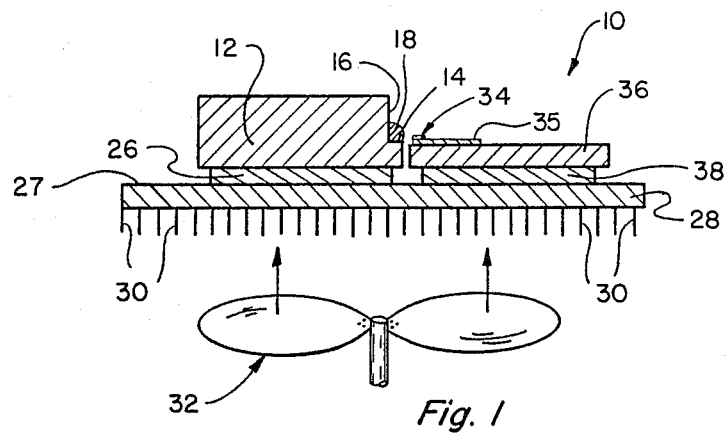
FIG. 1 is an enlarged cross-sectional elevational view taken through a mid location of a diode pumped laser device constructed according to the present invention.

Referring to the drawing more particularly by reference numbers, number 10 in FIG. 1 refers to a diode pumped laser device constructed according to one embodiment of the present invention. The device 10 includes a crystal mounting heat sink member 12 formed of a material such as polished copper, which member has a shelf 14 and adjacent wall 16 formed extending along one side and against which laser medium or crystal 18 is mounted. The laser medium 18 typically is a rod of a material such as Neodymium YAG (Yitrium Aluminum Garnet).

Figure 3:
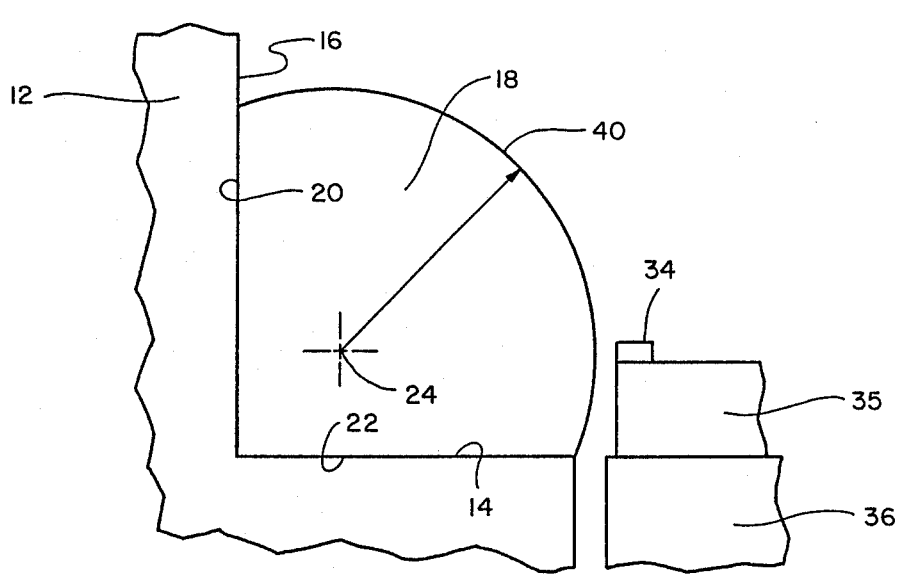
FIG. 3 is a greatly enlarged end view of the laser medium, pump source and mounting means therefor employed in the laser of the present invention.

The shape and mounting for the rod 18 are important to the construction and operation of the present device. Referring to FIGS. 1 and 3 the rod 18 is shown as being formed by modifying the shape of a cylindrical crystal rod as by grinding or otherwise forming one or more adjacent flat surfaces such as the surfaces 20 and 22 thereon. The surfaces 20 and 22 are shown being at right angles to each other and are made to be less deep than the radius of the rod 18 so that the center or axis 24 of the rod prior to forming the flat surfaces 20 and 22 is still present in the medium. When the modified rod 18 is mounted on the shelf 14 and against the wall 16, the shelf 14 will be in surface-to-surface abutment with the flat rod surface 22 and the wall 16 will be in surface-to-surface abutment with the flat rod surface 20. The surfaces 20 and 22 and the adjacent surfaces formed on the mounting member 12 all preferably have good reflective characteristics for the pump energy impinging thereon as will be explained. It is also possible to grind or form only one flat surface on the rod 18, which would be the surface 20, but this would not be as desirable as having two flats from the standpoint of heat dissipation. However from the standpoint of reflecting pump energy it would have some beneficial effect.

The heat sink member 12, which as stated is preferable constructed of a highly heat conductive material such as copper, is mounted on a cooler such as thermoelectric cooler member 26 which in turn is thermally attached to surface 27 of a much larger heat sink member 28. The thermal bond used should be highly heat conductive. The heat sink member 28 is shown having a plurality of spaced parallel outwardly extending metal fins 30 shown in the drawing extending downwardly for exposure to output cooling air blown thereagainst by fan 32.

A pump source or diode array 34 is positioned to produce side pumping of the crystal 18 and is in the form of single row or array of laser diodes made up of a plurality of adjacent individual diodes mounted on a conductive base member 35 which in turn is mounted on another polished copper heat sink member 36. The heat sink 36 is mounted in spaced adjacent relationship to the heat sink 12. The mounting of the diode array 34 is such that the diodes contained in the array 34 are closely spaced on one side of the crystal 18 and have their axes oriented to be aligned axially with the center 24 of the crystal or medium 18. The construction of the diode array 34 itself may be similar to the construction of either one of the arrays shown in copending Martin application Ser. No. 100,557. The details of the array construction will not be further described except to note that the present single array is mounted on the heat sink member 36 that is different from the heat sink member 12 on which the medium 18 is mounted.

The heat sink 36 for the pump source 34 is mounted on another thermoelectric cooler 38 that is spaced from the cooler 26, and the cooler 38, like the cooler 26, is attached to the same surface 27 of the larger heat sink member 28 using a suitable heat conductive interface. All connections between the various heat sinks and the coolers are such that they present minimal resistance to heat conductivity therebetween. This is so that the device can operate efficiently to dissipate heat generated by the various elements when the laser is operating. This is very important to the production of commercial side pumped lasers especially those used for CW applications.

Figure 2:
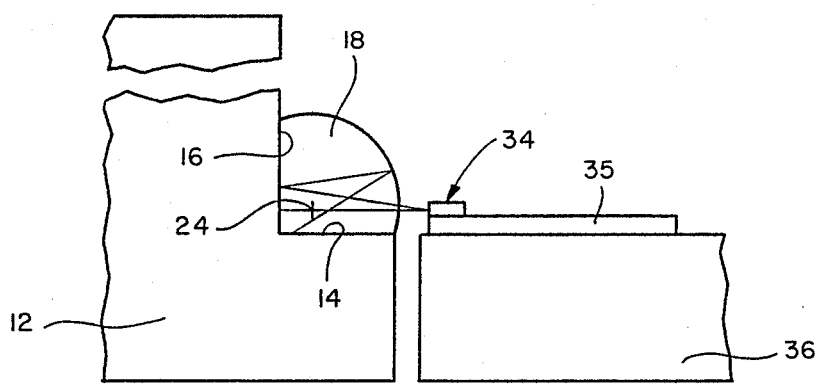
FIG. 2 is a further enlarged side elevational view of the laser device of FIG. 1 showing how typical divergent rays of pump energy are reflected back and forth through the laser medium.

Referring to FIGS. 2 and 3, the pump source or diode array 34 is shown with corresponding ends of the diodes in the single layer array positioned as close as possible to one side of the laser medium 18 and so positioned that most of the output pump energy generated therein is directed at locations along the center or axis 24 of the medium 18. However some amount of the pump energy will be directed at a different angle so that it will diverge and be projected angularly relative to the center 24 of the crystal. This diverging energy will impinge on and be reflected back through the crystal by the surfaces 20 and 16. Some of this reflected energy will impinge on the rounded outer surface 40 on the opposite side of the crystal 18 and be re-reflected thereby back through the crystal 18. To some extent this re-reflected energy will also be focused at the center of the crystal where an additional portion will be absorbed. Some amount of the energy reflected by the surfaces 20 and 16 will also pass out from the medium and be lost. Depending upon the direction of the reflction of the energy it is possible that some energy may actually be reflected back and forth several times across the medium. Some of the reflected energy may also be reflected back through the medium by the reflective characteristics of the medium surfaces 20 and 22 and as well as by the reflective characteristics of the surfaces 14 and 16, which as indicated, are preferably highly polished surfaces. Several reflected ray possibilities are illustrated by lines drawn on the crystal medium shown in FIG. 2. The ability of the medium and the adjacent surfaces to reflect and re-reflect and to some extent focus pump energy back and forth produces an ideal pumping geometry for the elements and results in a maximum amount of energy absorption by the crystal medium 18. This also maximizes the laser output for a given pump output and substantially increases the operating efficiency of the laser. To the extent that reflected energy is absorbed by the crystal the effeciency of the device is increased.

The construction of the present laser device lends itself to using separate mounting members or plates 12 and 36, preferably of polished copper, mounted on a larger heat sink member 28 with coolers such as coolers 26 and 38 positioned therebetween. The provision of separate coolers for the medium and for the pump source is an advantage because it enables each portion of the assembly, the medium portion and the pump portion, to be separated for maintenance and for separately tuning the different components to their respective power supplies and associated control electronics. This can be done before the components are installed in the laser or later after disassembly. It also makes possible removal of the components for maintenance, replacement and tuning as required.

Figure 4:
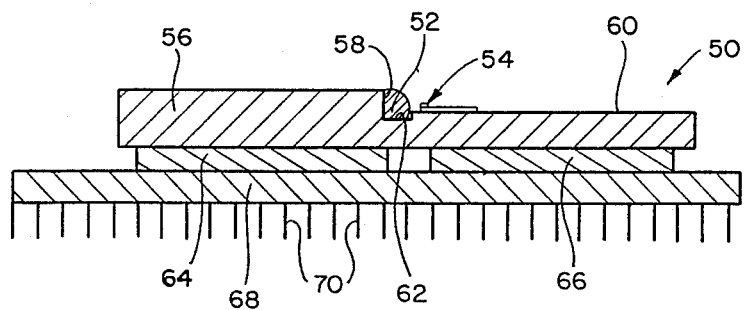
FIG. 4 is a cross-sectional view through a mid location of modified form of the subject diode pumped laser device.

FIG. 4 shows a modified form 50 of the subject laser device wherein the laser rod 52 and the pump source 54 are of similar construction to those shown in FIGS. 1–3 and are mounted in closely spaced relationship, but on the same mounting member 56 rather than on different mounting members. The mounting member 56 is formed of a material such as polished copper and has a shoulder 58 formed on one surface against which a flat face formed on the laser rod 52 abuts. The other flat face on the laser rod 52 rests on flat surface 60 on the mounting member 56 or is positioned as shown in abutment with the bottom surface of groove 62 provided therefor in the member 56. Whether the groove 62 is required and its depth will be determined by the size or diameter of the laser rod 52 after reshaping and should be such that the diodes in the diode array 54 which forms the pump source have their axes aligned with the center of the rod 52 as described in connection with the construction shown in FIGS. 1-3.

The support member 56 is attached as by heat conductive interfaces to surfaces on spaced cooler members 64 and 66 which coolers have their opposite surfaces similarly attached to a larger heat sink member 68. The heat sink 68 may be similar to the heat sink member 28 including having spaced parallel fins 70 against which cooling air is blown during operation.

Except for the fact that the elements 52 and 54 are mounted on the support member 56 rather than on separate support members, the modified laser 50 is similar to and operates similarly to the construction 10 described above. It is recognized that the modified laser structure 50 may not be as easy to assembly and disassembly into its components for individual testing and tuning, but for some applications this is not an important disadvantage and limitation as in other applications.

Figure 5:
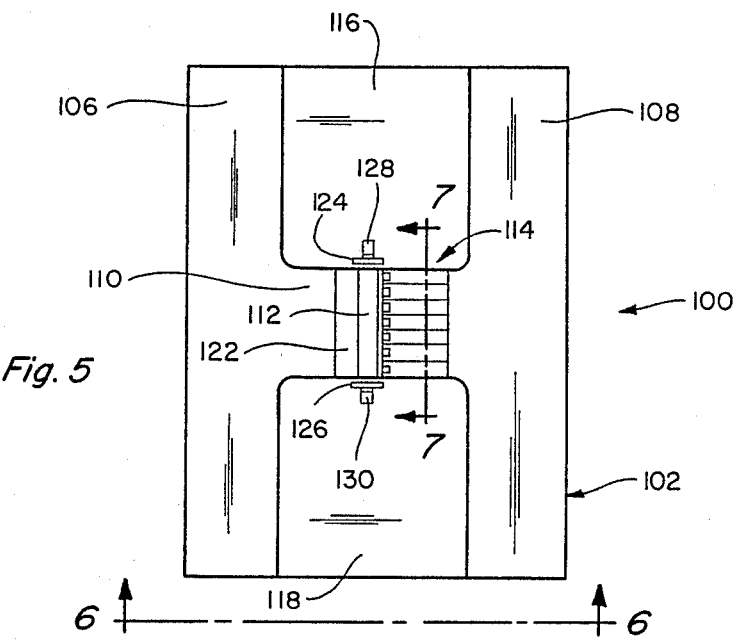
FIG. 5 is a top plan view of another modified form of the subject laser device.
Figure 6:
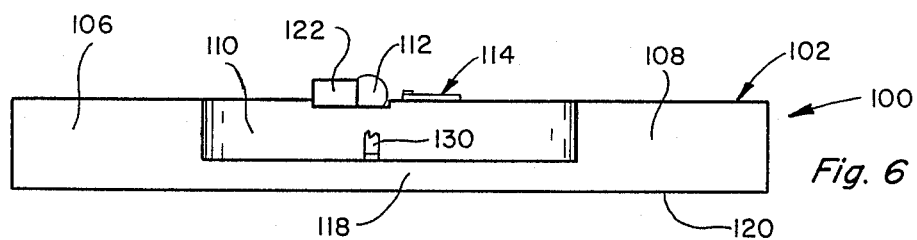
FIG. 6 is an end view of the laser device of FIG. 5 taken on line 6—6 therein.
Figure 7:
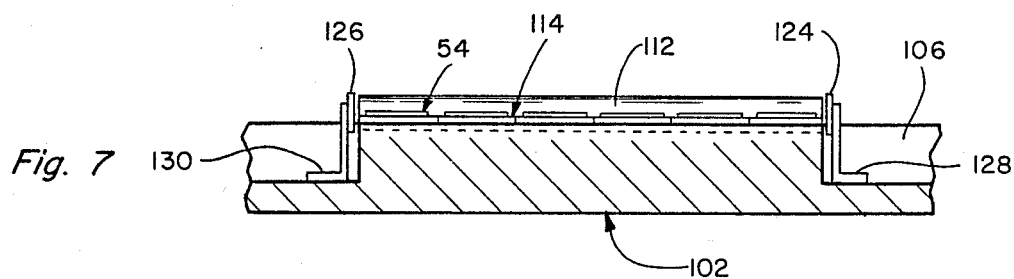
FIG. 7 is a cross-sectional view taken on line 7—7 of FIG. 5.

FIG. 5 shows another modified form 100 of the subject construction wherein a modified mounting member 102 is used which has an H-shaped portion which is thicker than other portions thereof. The thicker portion is formed by spaced parallel portions 106 and 108 and a portion 110 which is connected therebetween on which the active laser elements, including laser rod 112 and pump array 114, are mounted. The mounting member 102 also has a pair of spaced relatively thinner portions 116 and 118 which extend between and are defined in shape by the portions 106, 108 and 110. The member 102 also has an opposite smooth flat surface 120 and this surface is thermally attached to suitable cooler and to a heat sink member in the manner described above in connection with the other embodiments. Also in the construction 100 a block of material such as block 122 of a polished material is mounted on the mounting member 102 in position behind the laser rod 112 relative to the pump source to provide the desired reflective characteristics. The main advantages of the construction using the mounting member 102 is that it provides increased strength and rigidity because of its H-shaped portion and this increased strength and rigidity minimizes distortion and misalignment of the components including especially of mirrors 124 and 126 relative to the other laser elements. The mirrors 124 and 126 are shown mounted on respective L-shaped brackets 128 and 130 attached to the portions 116 and 118 of the member 102 adjacent to opposite ends of the laser rod 112. The added strength and rigidity is especially important because even small amounts of flexing or changes in the shape of the mounting member 102 especially when subjected to extreme changes in the temperatures can cause substantial misalignment of the mirrors and a corresponding reduction in the output.

Thus, there has been shown and described several embodiments of a novel laser device which fulfills all of the objects and advantages sought therefor. It will be apparent to those skilled in the art, however, that many changes, modifications, variations and other uses and applications for the subject device are possible. All such changes, modifications, variations and other uses and applications which do not depart from the spirit and scope of the invention are deemed to be covered by the invention which is limited only by the claims which follow.

What is claimed is:

1. A laser device comprising
an elongated laser medium of crystal material having a cylindrical shape modified to have a flat face formed on one side thereof,
a highly heat conducting mounting member having a flat surface on a portion thereof, said medium being mounted on the mounting member with the flat face of the medium in face-to-face relation with the flat surface on the mounting member,
a heat sink member having a surface for attaching the mounting member to,
a pump source including an array of laser diodes each having opposite ends and positioned in side-by-side single file relation,
a second highly heat conducting mounting member having a surface on which the array of laser diodes is positioned, said second mounting member being mounted on the heat sink member wherein the array of laser diodes are in substantial alignment with the axis of the medium along the side thereof opposite from the flat face of the medium wherein energy generated in the laser diodes will enter the medium and be projected therethrough, some of the generated energy being absorbed by the medium and some reflecting off the flat face of the medium and the adjacent flat surface on the mounting member to pass back through the medium.

2. The laser device of claim 1 wherein the medium has a second flat face formed thereon at right angles to the aforesaid flat face and the mounting member has a second flat surface in surface-to-surface contact with the second flat face on the medium.

3. The laser device of claim 1 wherein a separate cooler member is positioned between the mounting member and the heat sink member and between the second mounting member and the heat sink member.

4. The laser device of claim 1 wherein the surface of the medium has reflective characteristics.

5. The laser device of claim 4 wherein some of the pump energy reflected by the flat face of the medium inpinges on the curved opposite surface of the medium and is focused and reflected thereby back through the medium.

6. A laser device comprising an elongated laser medium of rod-like shape having its axis centrally located and having an external cylindrical surface modified by having at least one flat face formed thereon on one side, mounting means for the laser medium including a first mounting member having relatively high heat conductivity characteristics and a flat surface thereon, the flat face on the medium being mounted to be positioned in surface-to-surface contact with the flat surface on the first mounting member, a pump source including an array of elongated laser diode elements positioned side-by-side in a row, mounting means on which the pump source is mounted including a second mounting member having relatively high heat conductivity characteristics, and means for dissipating heat generated in the medimm and in the pump source, said heat dissipating mean including a cooler member respectively attached to each of the first and second mounting members and a heat sink member, said cooler members being attached to the heat sink member in spaced relationship such that corresponding ends of the laser diode elements in the array are positioned adjacent to the medium on the side thereof opposite to the flat surface thereon and such that the laser diode elements are aligned with the centrally located axis of the medium on one side thereof whereby pump energy generated by the laser diode elements is primarily directed into the medium toward the centrally located axis but includes some pump energy that diverges and passes through the medium impinging on the flat surface of the medium and on the adjacent flat surface of the first mounting member being reflected thereby back through the medium, some of said divergent reflected energy impinging on and being re-reflected and to some extent focused by the cylindrical outer surface of the medium toward the centrally located medium axis to increase the amount of pump energy absorbed by the medium.

7. The laser device of claim 6 wherein the medium has two adjacent flat faces formed thereon and oriented at right angles to each other, the first mounting means including a copper member having a shelf formed thereon with an adjacent flat surface, the adjacent flat faces on the medium being positioned adjacent respectively to the shelf and adjacent flat surface on the first mounting member.

8. The laser device of claim 6 wherein the medium is a Neodymium YAG rod.

9. The laser device of claim 6 wherein the heat sink member has a plurality of spaced outwardly extending fins, and means for blowing air against the fins.

10. The laser device of claim 6 wherein the laser diodes in the pump source are arranged in a single row of adjacent diodes and means connecting the laser diodes to a source of pump energy to cause the diodes to lase and emit pump energy.

11. The laser device of claim 6 wherein the first and second mounting members are attached to the respective cooler members and the cooler members are attached to the heat sink member by a heat conductive adhesive material.

12. A laser device comprising a support member of a highly heat conductive material having opposite surfaces and an upstanding wall portion formed at an intermediate location on one of the opposite surfaces and extending thereacross, an elongated laser rod member having a flat formed extending along one side thereof, means mounting the laser rod on the support member with the flat on the rod being in surface-to-surface abutment with the upstanding wall and forming a heat conductive interface therebetween wherein heat generated in the laser rod will be conducted into the support member, a pump source formed by a plurality of elongated diode laser elements arranged in side-by-side relationship in a row, said pump source being mounted on the support member in closely spaced relation to the laser rod on one side thereof such that the axes of the diode lasers are substantially aligned with a center location along the laser rod wherein when the diode lasers are stimulated to lase they will generate pump energy directed at locations along the central location of the laser rod, a heat sink member and means forming a heat conductive interface between the support member and the heat sink member wherein the heat generated in the laser rod and in the diode lasers is conducted into the support member and from there into the heat sink member.

13. The laser device of claim 12 wherein the laser rod has adjacent angularly related flats formed extending thereabove, one of said flats being positioned in surface-to-surface abutment with the upstanding wall on the support member and the other of said flats being in surface-to-surface abutment with said one opposite surface of the support member.

14. The laser device of claim 13 wherein a highly heat conductive interface is formed between each of the flats on the laser rod and the adjacent upstanding and one opposite surface of the support member.

15. The laser device of claim 12 wherein a groove is formed in the said one opposite surface of the support member adjacent to the upstanding wall, at least a portion of the laser rod being positioned in the said groove.

16. The laser device of claim 12 wherein the upstanding wall on the support member has highly polished and reflective characteristics.

17. The laser device of claim 12 including at least one cooler member positioned between the support member and the heat sink member, the surfaces of the cooler adjacent to the support member and adjacent to the heat sink member forming highly heat conductive interfaces therebetween.

18. The laser device of claim 12 wherein the laser rod is a rod of Neodymium YAG.

* * * * *

UNITED STATES PATENT OFFICE
CERTIFICATE OF CORRECTION

Patent No. 4,805,177　　　　　　　　Dated February 14, 1989

Inventor(s) Martin et al

It is certified that error appears in the above-identified patent and that said Letters Patent is hereby corrected as shown below:

Column 2, line 37, "mmember" should be --member--.

Column 3, line 19, "objet" should be --object--.

Column 3, line 33, "provdde" should be --provide--.

Column 8, line 8, "medimm" should be --medium--.

Signed and Sealed this

First Day of August, 1989

Attest:

DONALD J. QUIGG

Attesting Officer　　　Commissioner of Patents and Trademarks